Nov. 12, 1940.  H. A. S. HOWARTH  2,221,051
LUBRICATOR FOR JOURNAL BEARINGS
Original Filed Feb. 24, 1937  14 Sheets-Sheet 1
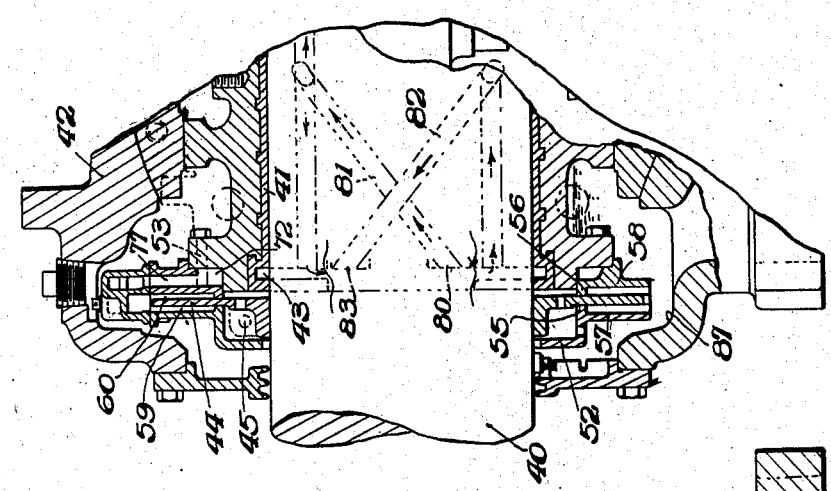
Inventor
Harry A. S. Howarth.
By Cameron, Kerkam + Sutton.
Attorneys

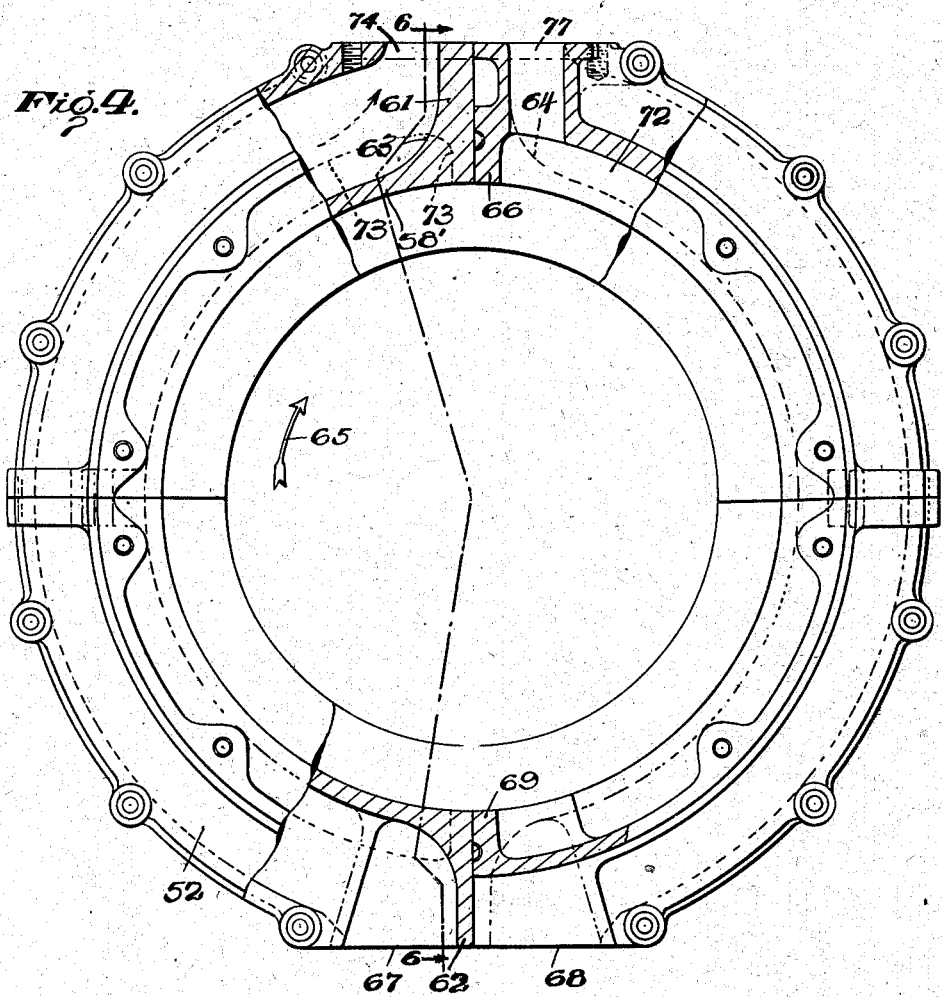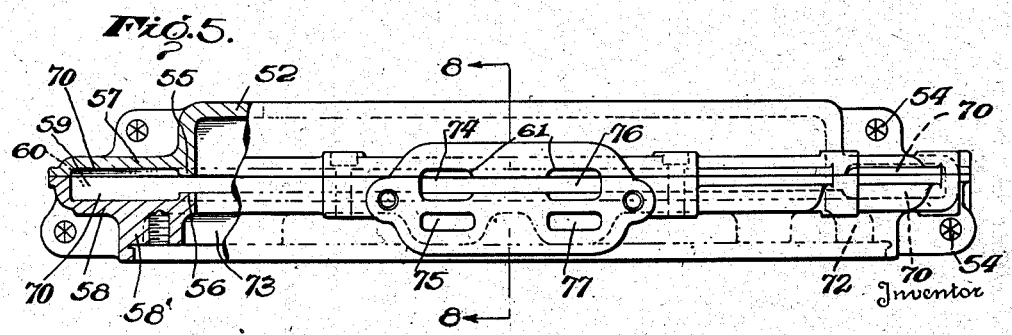

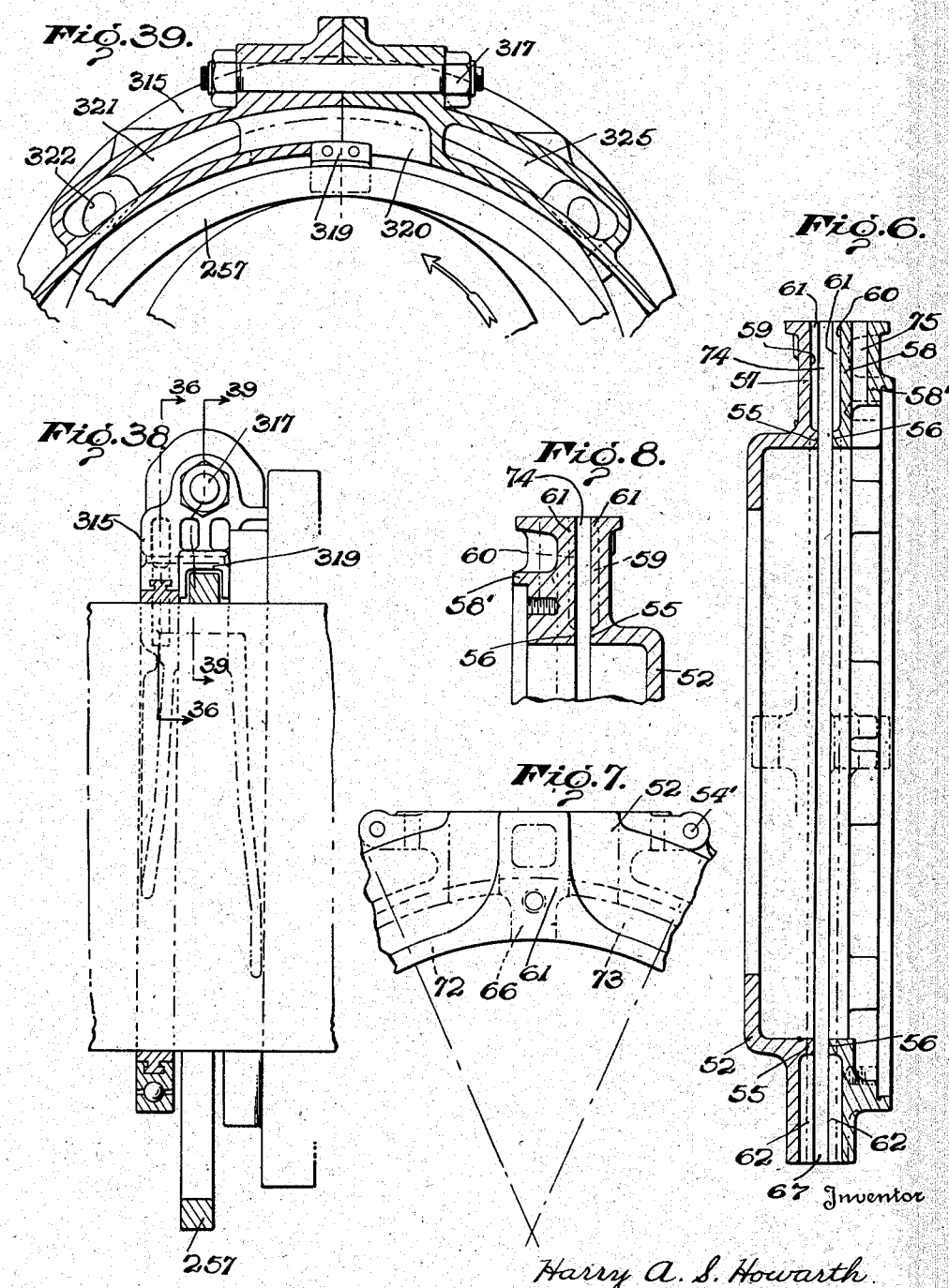

Nov. 12, 1940.   H. A. S. HOWARTH   2,221,051
LUBRICATOR FOR JOURNAL BEARINGS
Original Filed Feb. 24, 1937   14 Sheets-Sheet 4
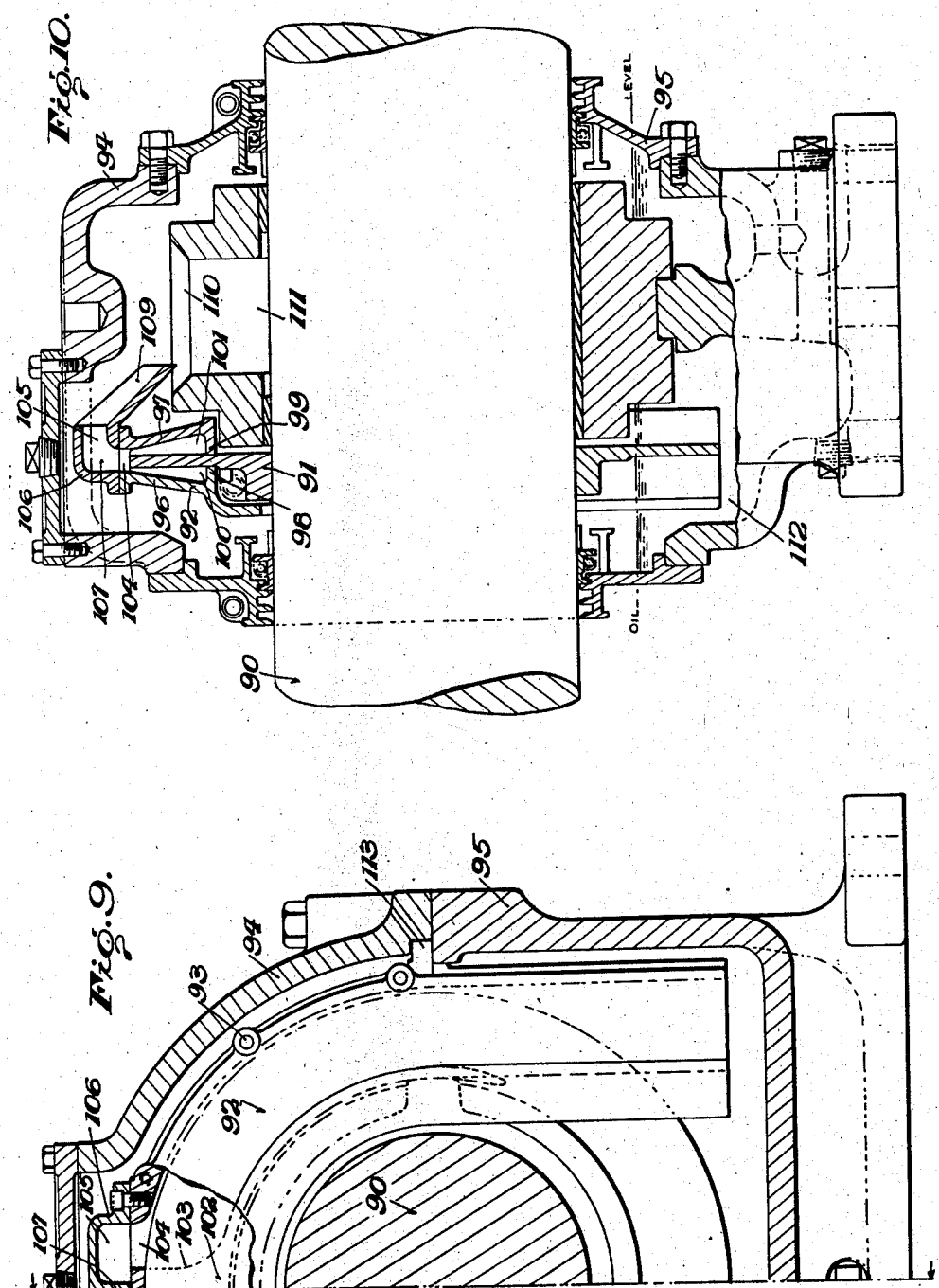

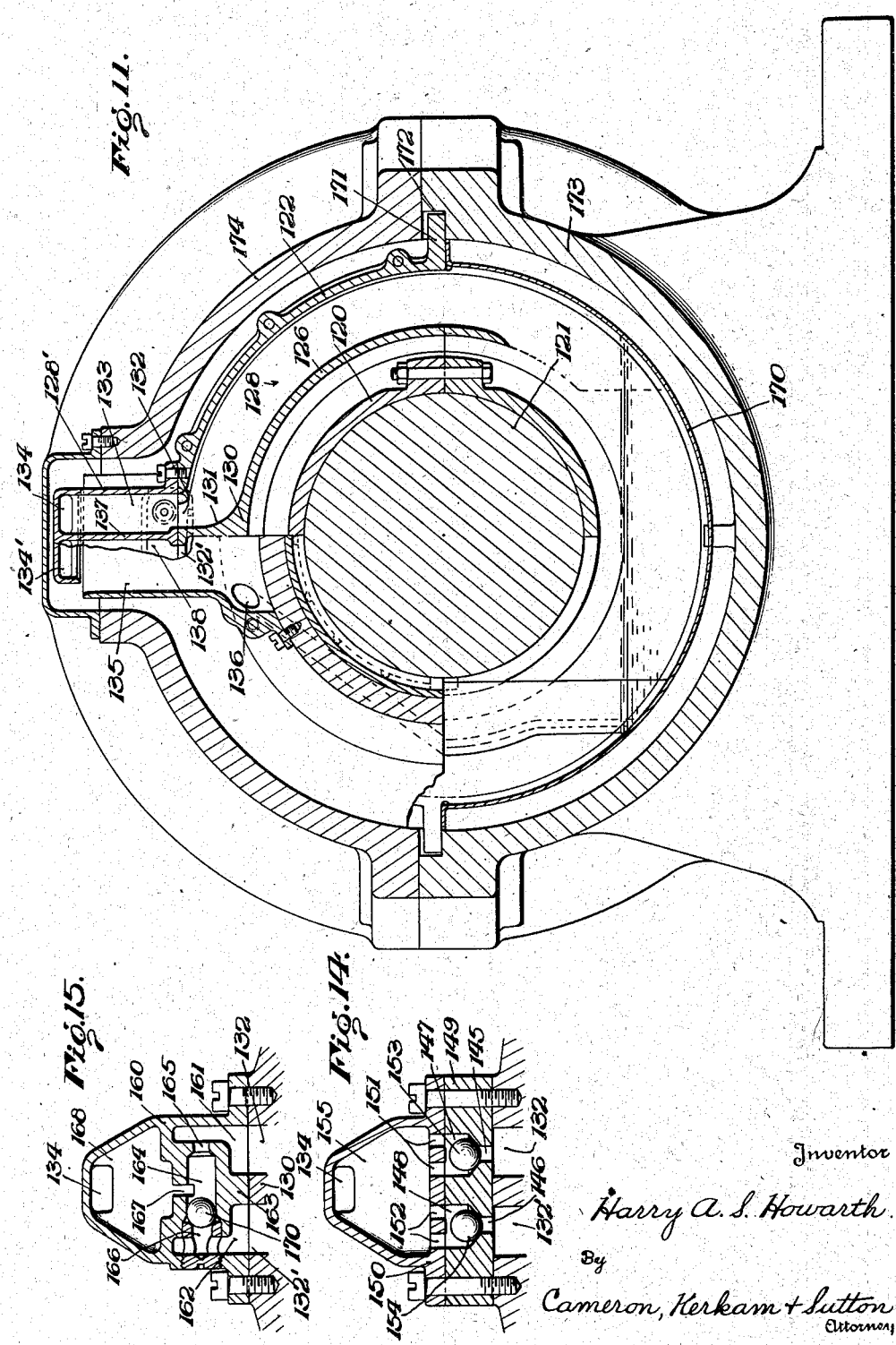

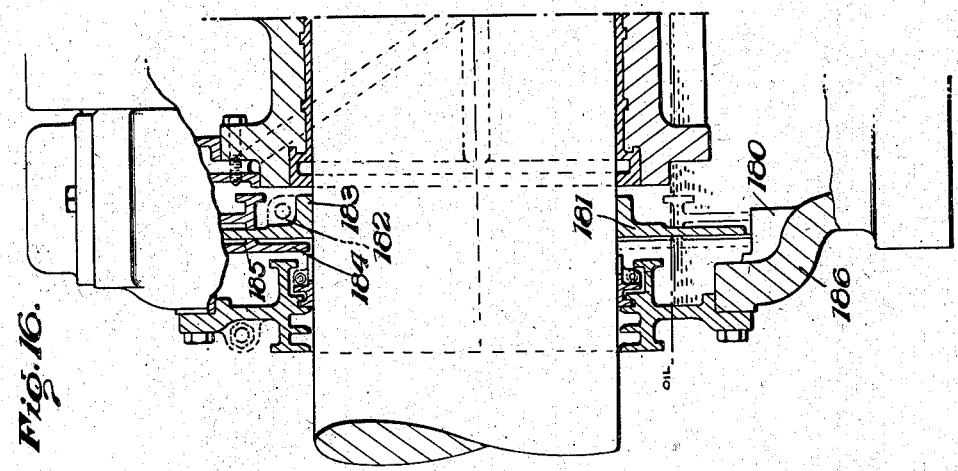

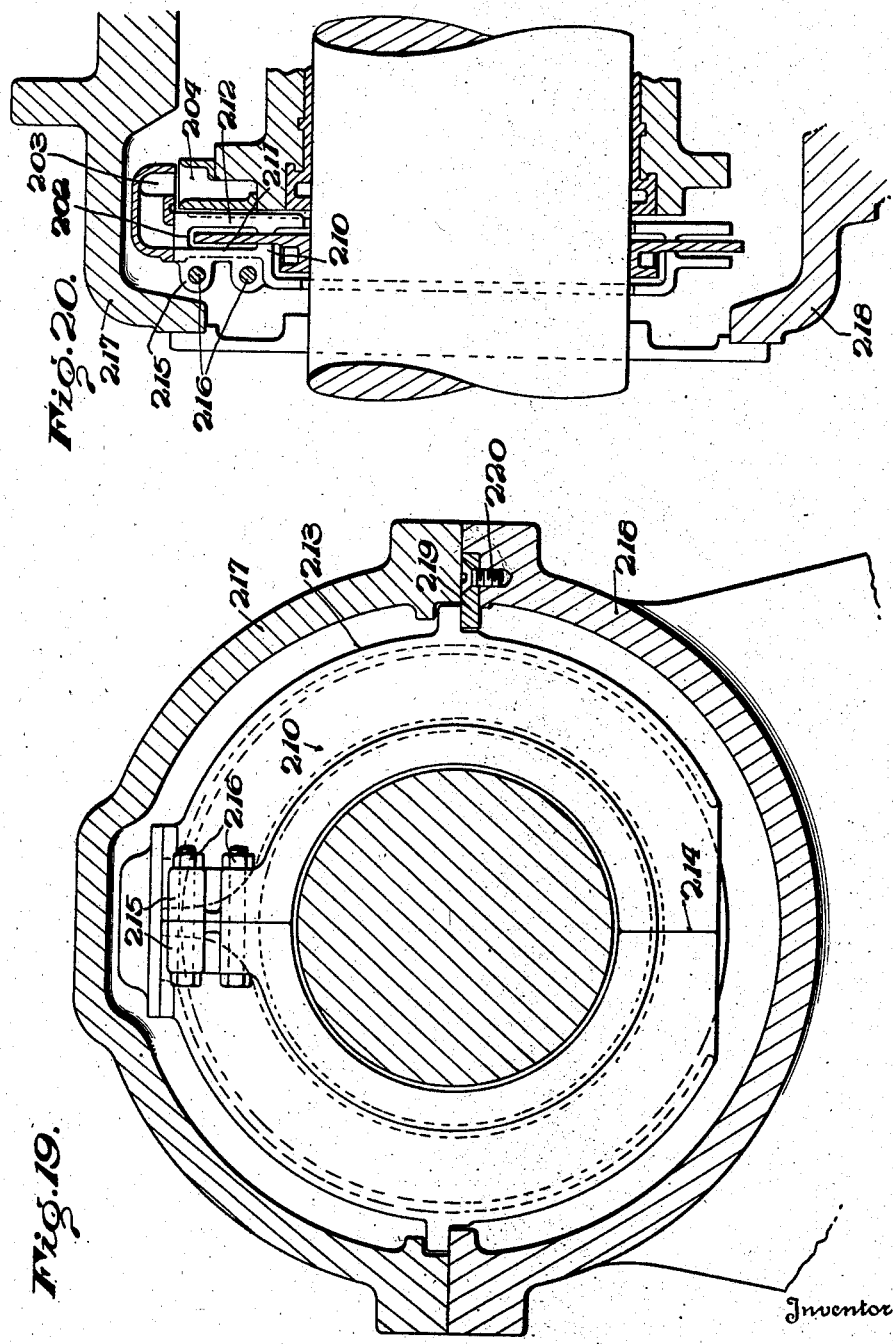

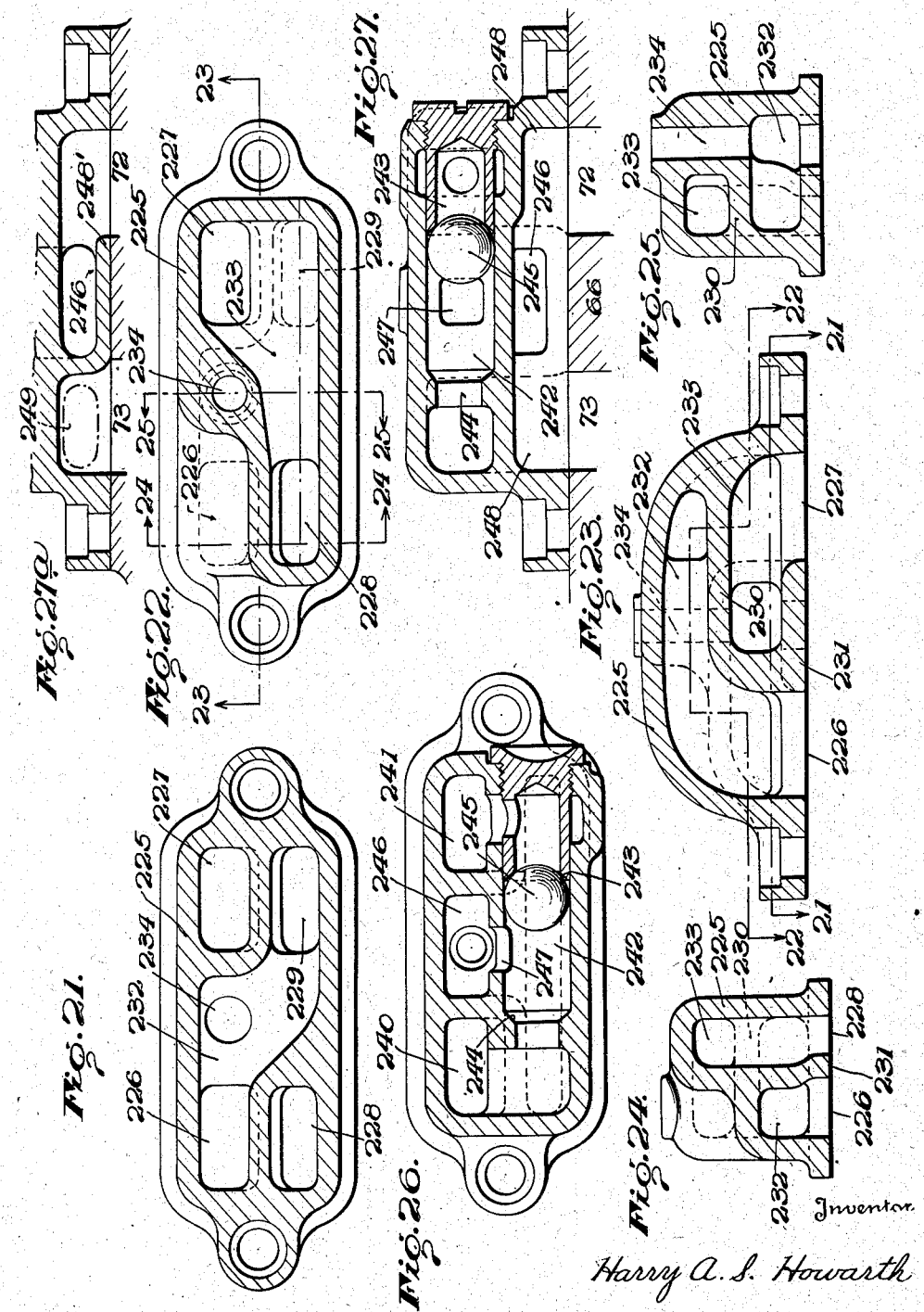

Nov. 12, 1940.   H. A. S. HOWARTH   2,221,051
LUBRICATOR FOR JOURNAL BEARINGS
Original Filed Feb. 24, 1937   14 Sheets-Sheet 10
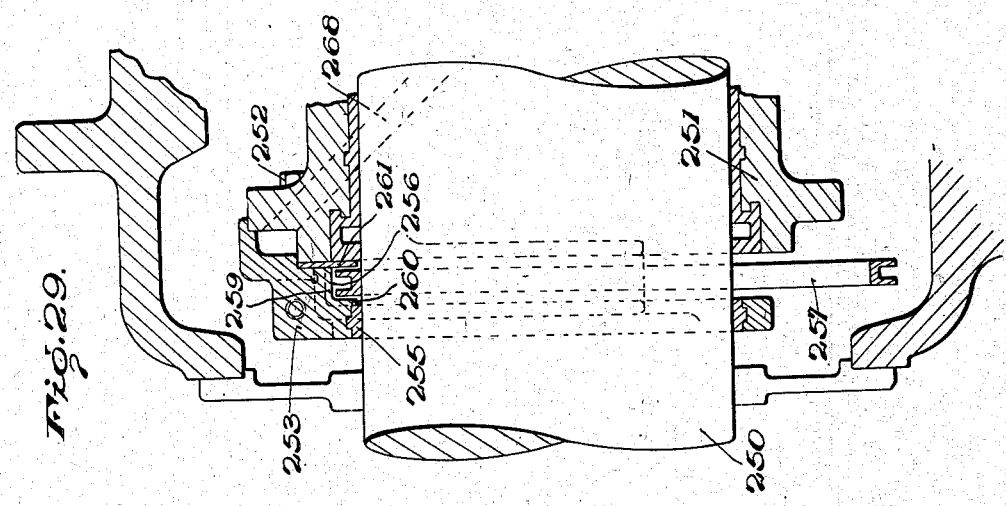
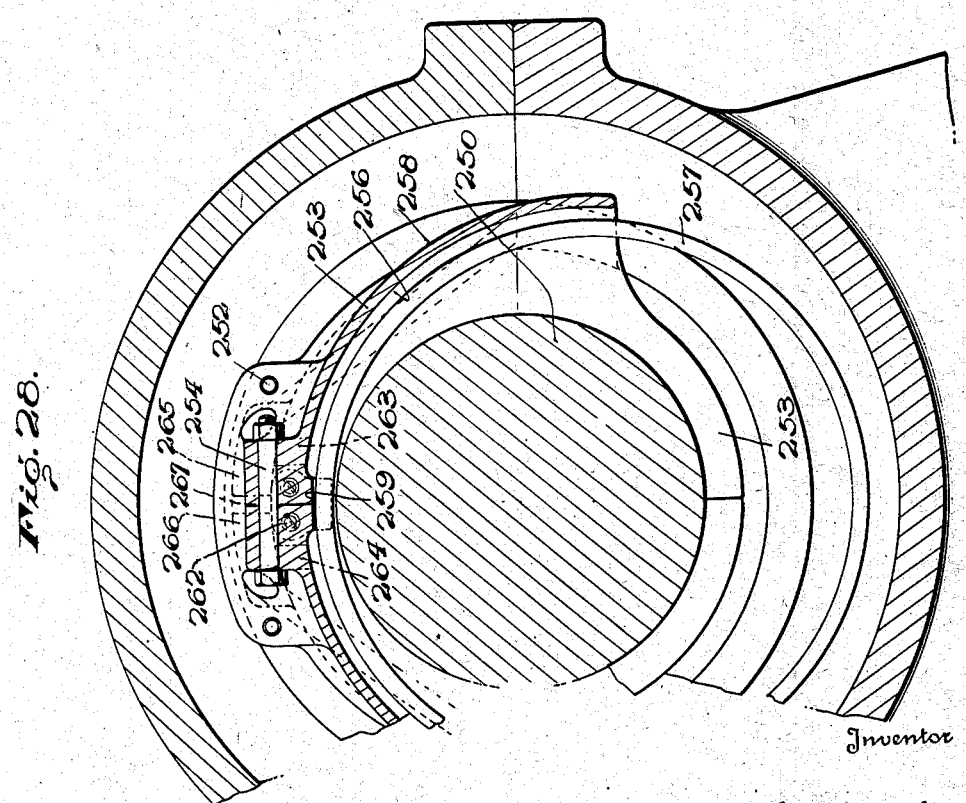
Inventor
Harry A. S. Howarth.
By Cameron, Kerkam + Sutton
Attorneys Nov. 12, 1940.    H. A. S. HOWARTH    2,221,051
LUBRICATOR FOR JOURNAL BEARINGS
Original Filed Feb. 24, 1937    14 Sheets-Sheet 11

Inventor

Harry A. S. Howarth.

By Cameron, Kerkam & Sutton
Attorneys

Nov. 12, 1940.   H. A. S. HOWARTH   2,221,051
LUBRICATOR FOR JOURNAL BEARINGS
Original Filed Feb. 24, 1937   14 Sheets-Sheet 12
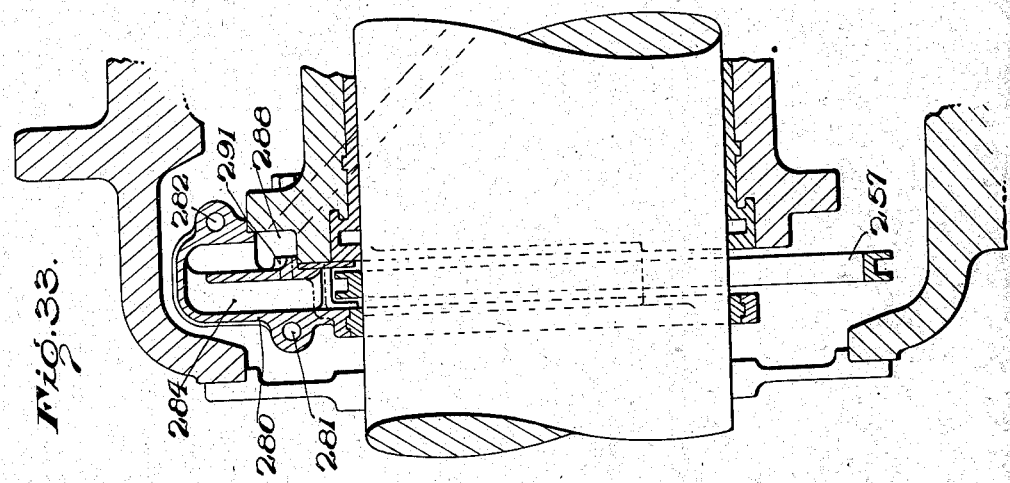
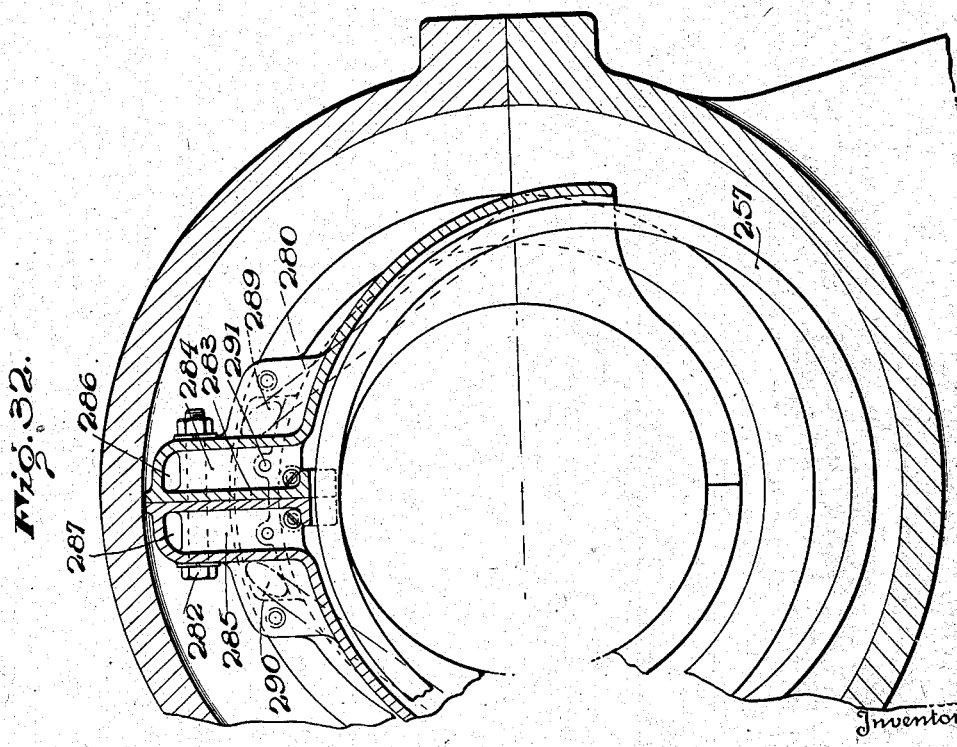
Inventor
Harry A. S. Howarth
By Cameron, Kerkam & Sutton
Attorneys

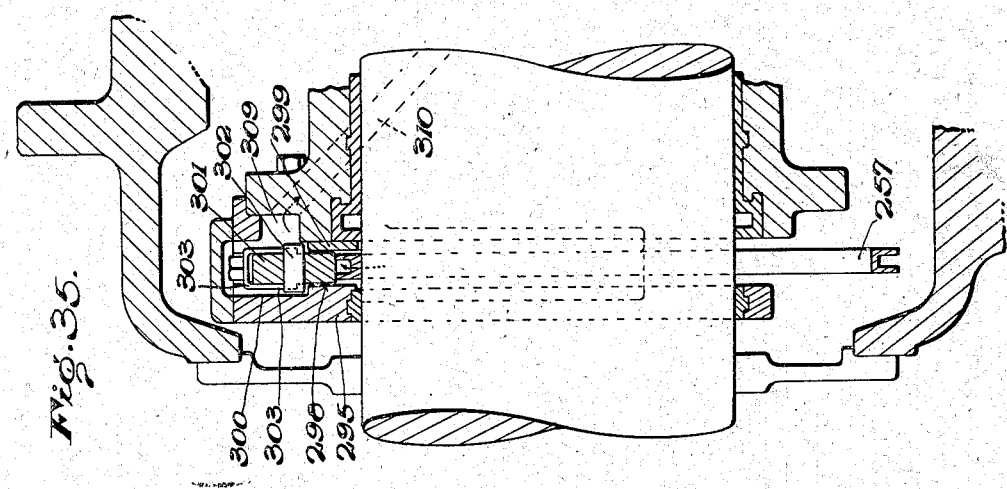
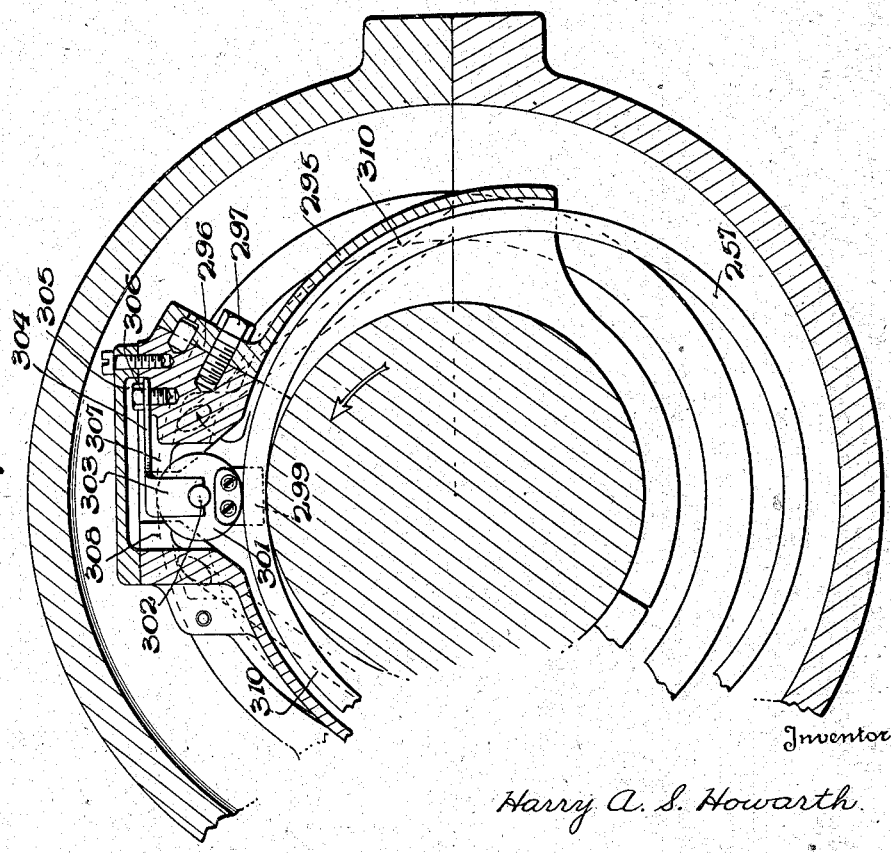

Patented Nov. 12, 1940

2,221,051

UNITED STATES PATENT OFFICE 2,221,051

LUBRICATOR FOR JOURNAL BEARINGS

Harry A. S. Howarth, Philadelphia, Pa., assignor to Kingsbury Machine Works, Inc., Philadelphia, Pa., a corporation of Delaware Original application February 24, 1937, Serial No. 127,552, now Patent No. 2,182,539, dated December 5, 1939. Divided and this application November 10, 1937, Serial No. 173,918

16 Claims. (Cl. 308—127)

This invention relates to lubricating means for radial bearings, and is more particularly directed to means which may be readily associated with the shaft of a journal bearing for supplying copious quantities of lubricant to said bearing from an oil well or reservoir associated with the bearing.

It is an object of this invention to provide an improved device of the type characterized whereby in the rotatable parts thereof may be readily mounted on the shaft in association with the shell of the journal bearing but which will move axially with the shaft to partake of any longitudinal movements of the latter.

Another object of this invention is to provide an improved device of the type characterized wherein the stationary parts thereof may be readily lowered into association with the shaft and the rotatable elements of the lubricating means, and properly secured in operative position, when the upper half of the bearing housing is removed.

Another object of this invention is to provide an improved device of the type characterized wherein the casing portion of the lubricating means may be readily made in one piece for smaller sized bearings or in two or more pieces for larged sized installations.

Another object of this invention is to provide an improved device of the type characterized which may be readily adapted to either low or high speed bearings.

Another object of this invention is to provide an improved device of the type characterized which is available for either direction of shaft rotation, and in the event of use with a reversible shaft will lubricate the bearing for either direction of rotation.

Another object of this invention is to provide an improved device of the type characterized which may be readily adapted to shafts on which the direction of the load may vary for different installations and which may still provide that the lubricant be first directed to the loaded side of the bearing.

Another object of this invention is to provide an improved device of the type characterized which may develop a substantial head for forcing the lubricant under considerable pressure through the journal bearing.

Another object of this invention is to provide an improved device of the type characterized which will produce a relatively high head for the lubricant when the shaft is rotating at a relatively high speed and which will yet supply lubricant at lower pressure to the journal bearing while the shaft is rotating at a lower speed.

Another object of this invention is to provide an improved device of the type characterized which includes valve means whereby the lubricant supplied to the bearing surfaces by the circulating means may be maintained under a pressure which minimizes aeration of the lubricant during its flow through its passages.

Another object of this invention is to provide an improved device of the type characterized which includes valve means that will automatically assure flow of the lubricant in the desired direction upon change in the direction of rotation.

Another object of this invention is to provide an improved device of the type characterized which may employ either a rotating disk or a rotating ring as a means for elevating the oil to the oil removing and directing means.

Another object of this invention is to provide an improved device of the type characterized which employs a rotating disk or ring in conjunction with means cooperating therewith to raise lubricant and direct the same to the journal bearing by reason of the viscosity pumping action of the rotating disk or ring.

Another object of this invention is to provide an improved device of the type characterized employing a rotating ring and means for assuring rotation of the ring at a speed which varies with the speed of the shaft.

Another object of this invention is to provide an improved device of the type characterized which is readily adaptable to various sizes and constructions of journal bearings so that it may assure adequate lubrication thereof under the various conditions met in practice.

Another object of this invention is to provide an improved device of the type characterized which is relatively simple in construction, easy to manufacture and standardize for various installations readily assembled and disassembled with respect to the shaft and its associated journal bearing, and highly efficient in operation in supplying copious quantities of lubricant for circulation to and through the journal bearing both to assure maintenance of proper bearing films and also abstract heat generated therein.

Other objects will appear as the description of the invention proceeds.

The invention is capable of receiving a variety of mechanical expressions, some of which are shown on the accompanying drawings, but it is to be expressly understood that the drawings have been selected for purposes of illustration only, and are not to be construed as definitions of the limits of the invention, reference being had to the appended claims for that purpose.

The present application is in part a continuation of applicant's copending application Serial No. 127,552, filed February 24, 1937, for Radial bearings, now matured into Patent 2,182,539 issued Dec. 5, 1939.

Referring in detail to the accompanying drawings, wherein like reference characters are employed to designate corresponding parts in the several figures:

Fig. 1 is an end section of an embodiment of the present invention, the right and left-hand halves being taken on different planes at right angles to the axis of the shaft;

Fig. 2 is an axial section of the embodiment of Fig. 1 but taken on the far side of the dams;

Fig. 3 is a fragmentary top plan view of the lubricating means with the cap thereof removed;

Fig. 4 is an enlarged end view, partly broken away and to show parts in section on different planes at right angles to the shaft axis in the right and left-hand halves thereof, of the casing of the lubricating means employed in the embodiment of Fig. 1, the same being seen from the opposite side from Fig. 1;

Fig. 5 is a top plan view of the structure shown in Fig. 4;

Fig. 6 is a sectional view on line 6—6 of Fig. 4;

Fig. 7 is a fragmentary view of the upper portion of the structure of Fig. 4;

Fig. 8 is a fragmentary section on the line 8—8 of Fig. 5;

Fig. 9 is a half radial section and Fig. 10 is an axial section of another embodiment of the present invention;

Fig. 11 is a sectional view of another embodiment, different portions of said section being taken on different planes at right angles to the axis of the bearing;

Fig. 12 is an axial section of the embodiment of Fig. 11;

Fig. 13 is a fragmentary axial section of a modification which may be incorporated in the embodiment of Figs. 11 and 12;

Figs. 14 and 15 are fragmentary views of different forms of valves that may be used in conjunction with embodiments of this invention;

Fig. 16 is an axial section of another embodiment of the present invention;

Figs. 19 and 20 are, respectively, an end view and an axial section of another embodiment of the present invention;

Fig. 21 is a section of one form of oil distributing cap embodying the present invention, the same being taken on the line 21—21 of Fig. 23, said cap being interchangeable with the cap of Figs. 1 to 8.

Fig. 22 is a section of the same construction taken on the line 22—22 of Fig. 23;

Fig. 23 is a sectional view on the line 23—23 of Fig. 22;

Figs. 24 and 25 are sectional views taken on the lines 24—24 and 25—25 of Fig. 22;

Figs. 26 and 27 are, respectively, horizontal and vertical sections of a cap employing a valve;

Fig. 27A is a fragmentary view of an alternative construction.

Figure 31:
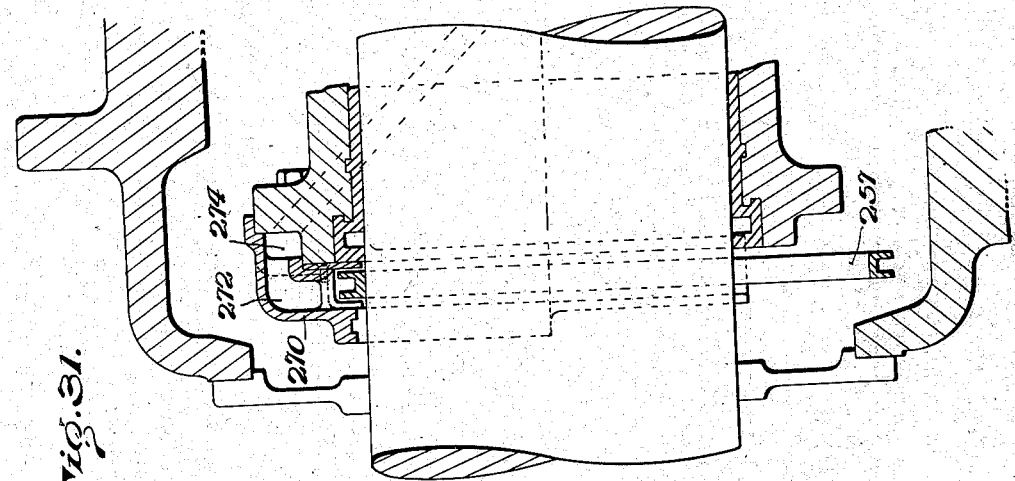
Figure 30:
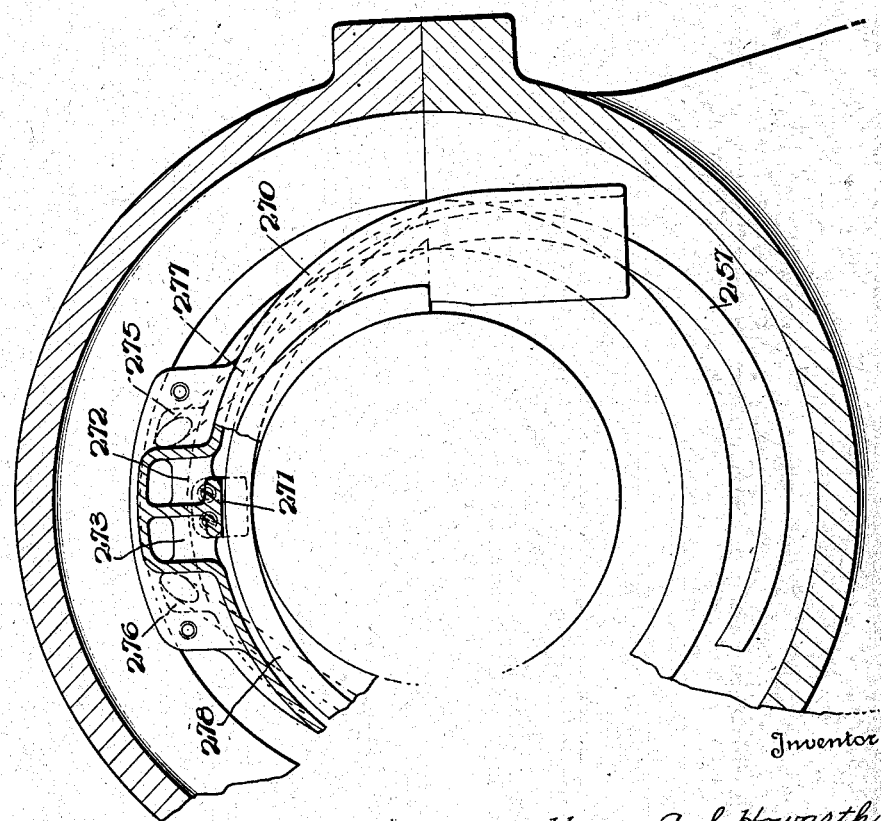
Figure 36:
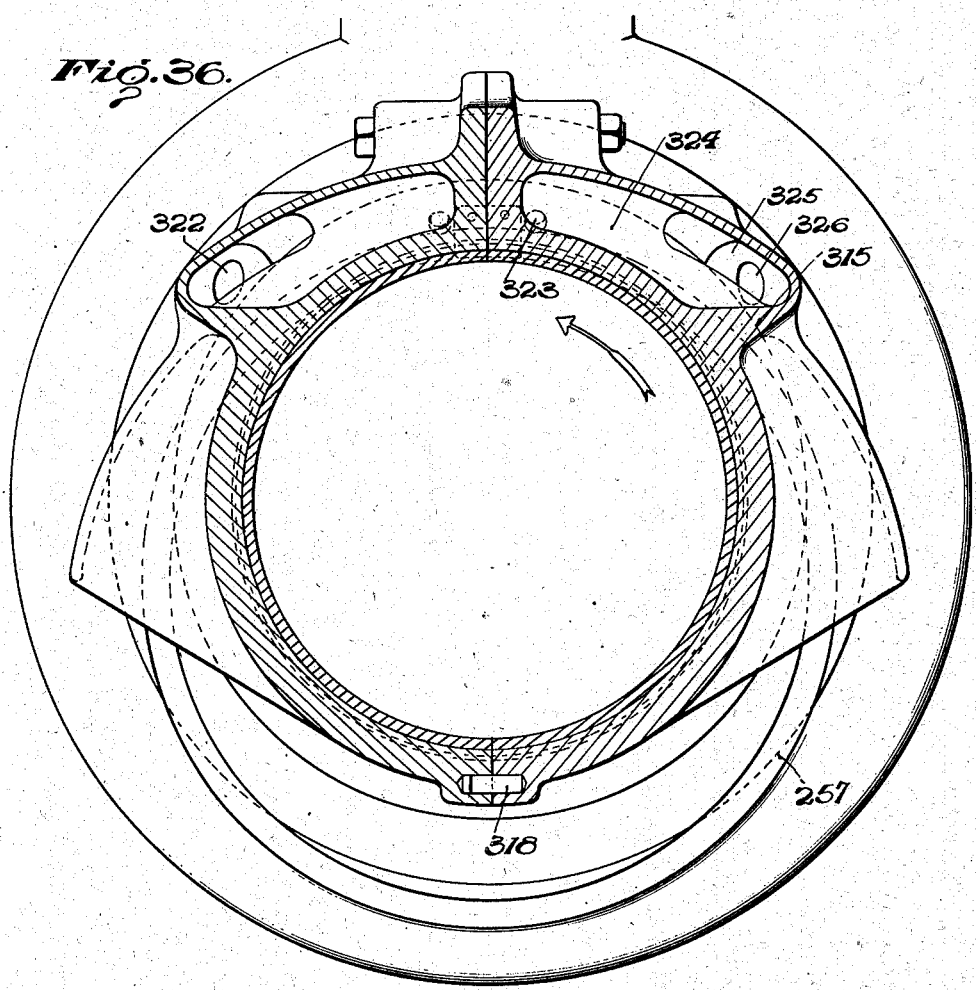
Figure 37:
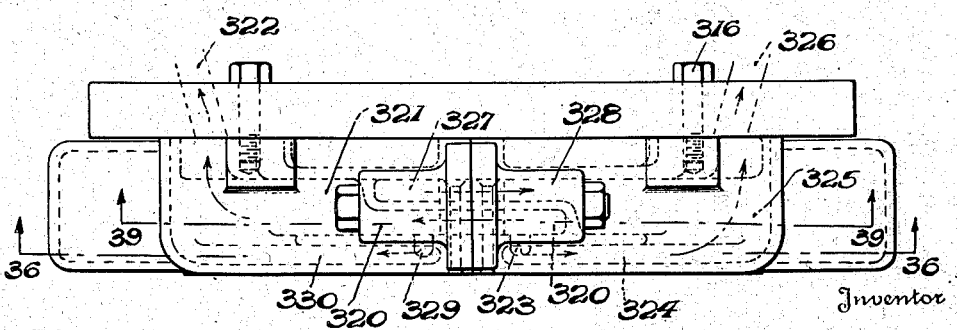

Figs. 28 and 29 are radial and axial sections, respectively, of another embodiment of the present invention;

Figs. 30 and 31 are radial and axial sections, respectively, of yet another embodiment of the present invention;

Figs. 32 and 33 are radial and axial sections, respectively, of a further embodiment of the present invention;

Figs. 34 and 35 are radial and axial sections, respectively, of yet another embodiment of the present invention;

Fig. 36 is a sectional view of yet another embodiment of the present invention, taken on the lines 36—36 of Figs. 37 and 38;

Fig. 37 is a top view of the embodiment of Fig. 36;

Fig. 38 is an edge view of one of the half sections of the embodiment of Figs. 36 and 37 looking from the vertical plane through the center of the shaft tangentially outwardly; and Fig. 39 is a fragmentary sectional view of the same embodiment on line 39—39 of Figs. 37 and 38.

The present invention provides means for elevating oil from an oil well or reservoir below the shaft and directing said oil to one or more associated journal bearings, the oil being preferably led first to the loaded side of said bearing, and the oil being preferably caused to flow through both the oil distributing grooves and the oil sealing grooves of each journal bearing. The lubricating means so provided is preferably made reversible so that it will operate satisfactorily for either direction of shaft rotation. Said lubricating means is adapted to develop the desired head for forcing the oil with the desired pressure through the journal bearing or bearings, and is also adapted to be applied either to high or to low speed bearings. The invention includes the use of either rotating disks or rotating rings for raising oil from the well below the shaft, and involves means associated with said disk or ring whereby the oil so elevated is removed and led under the desired pressure to the journal bearing or bearings. In the embodiments to be described the lubricating means has in each instance been disposed at the end of the journal bearing shell, and it will be apparent that the lubricating means may be associated with either or both ends of the bearing shell as preferred; however, in its broader aspects, the present invention is not limited to the use of the lubricating means at the end of the bearing shell, as it will be at once apparent to those skilled in the art that many of the features of the present invention may be incorporated in either disk or ring oiling means which may be associated with an intermediate part of the journal bearing shell, as by suitably interrupting or subdividing the journal bearing shell. Certain features may also be employed in conjunction with pressure oiling as will be apparent to those skilled in the art.

Referring first to the embodiment of Figs. 1 to 8, the shaft 40 is shown as provided with any suitable journal bearing having a shell 41 and which may be constructed in any suitable way and mounted in any suitable housing 42, the bearing surface of said journal bearing, which may be of babbitt or of any other suitable construction, being provided with any suitable character and arrangement of grooves diagrammatically indicated in some of the views, and said journal bearing also being preferably provided with an oil sealing groove at one or both ends of the bearing, one being illustrated, for example, at 43 in Fig. 2. As the construction and grooving of the journal bearing form no part of the present invention further description thereof is believed to be unnecessary. The bearing shell 41 is preferably made in halves with the joint in any suitable plane, here shown as at 45° to the vertical as shown at 41a in Fig. 1.

Mounted on the shaft 40 adjacent the end of the journal bearing shell 41 is a rotatable disk 44 secured to the shaft to rotate therewith in any suitable way. Said disk is preferably made in halves which may be suitably secured together around the shaft in any suitable way, as by one or more bolts as diagrammatically indicated at 45. If preferred the hub of said disk 44 may be resiliently gripped to the shaft, and to this end, as shown in the right half of Fig. 1, the two halves of said hub may be provided with radially projecting lugs 46 containing aligned apertures 47 in which is disposed a bolt 48 having at one end a head 49 between which and the bottom of the recess 50 in the corresponding lug 46 is disposed a coil spring 51 that normally urges the two halves of the hub into gripping relationship with the shaft.

Associated with said rotatable disk 44 is a casing 52 which may be and preferably is suitably attached to the end of the bearing shell 41 as by one or more bolts 53. Said casing may be made in halves whose plane of junction is in any suitable plane containing the axis of the shaft, with the halves suitably united by bolts 54 (see Fig. 5), or said casing may be made divisible at a plane parallel to the rotating disk, with the sections united by bolts at the aligned apertures designated 54', (see Fig. 7), or as shown said casing may be made divisible at both locations so that the casing is composed of four semicircular sections. A simpler construction, however, is one wherein the casing is composed of two semicircular sections which are generally U-shaped in cross section and which may be united in a plane containing the axis of the shaft so as to embrace the rotating disk 44, as will hereinafter appear, or, particularly for smaller sized installations, the casing may be made in one piece which is of inverted U-shaped configuration and generally U-shaped in cross section so that the same may be lowered as a unit into embracing relationship with the periphery of the disk, as will also appear hereinafter.

The casing, whether formed in one, two or more parts, is so constructed interiorly as to cooperate with said disk 44 in forming a viscosity pump. As shown, said casing has inwardly directed circumferential beads or ribs 55 and 56 projecting from its lateral walls 57 and 58, said circumferential beads being disposed radially outwardly of the hub of the disk 44 and closely adjacent the lateral faces of the disk 44 so as to provide between said ribs and the peripheral wall of the casing 52, at each side of the disk 44, axially narrow pumping chambers 59 and 60. Each of said pumping chambers 59 and 60 is also provided adjacent the top and bottom of the casing with radially extending dams 61 and 62 which project axially inward from the lateral walls 57 and 58 into adjacency with the lateral faces of the disk 44. At each side of the disk 44 the dam 61 takes the form shown in Fig. 1 having curved upwardly directed edges 63 and 64 disposed adjacent the face of the disk so that the oil carried upwardly in the corresponding pumping chamber is removed from the disk and deflected upwardly, as shown by the arrow in Fig. 1, when the shaft is rotating in the direction of the arrow 65 of that figure. At each side of the disk 44 the dam 62 (see left-hand side of Fig. 4 and right-hand side of Fig. 1) extends to or beyond the periphery of the disk 44 and constitutes a division wall between two apertures 67 and 68 which afford communication between the oil reservoir and the pumping chambers at opposite sides of the vertical medial plane. Thus at the two sides of the pumping disk there are two semicircular pumping chambers 70 and two semicircular pumping chambers 71 leading from entrance apertures 67 and 68, respectively, through which oil will be elevated, depending upon the direction of shaft rotation, to the dams 61 with their oil deflecting edges 63 or 64.

The wall 58 of said casing which is adjacent to but spaced from the end wall or flange of the bearing shell is also provided with diametrically disposed dams or partitions 66 and 69 which subdivide the annular chamber between wall 58 and the adjacent end of the bearing shell and bounded peripherally by the circumferential rib 58' (Fig. 4) into two semi-circular chambers 72 and 73 for purposes to be explained.

The top of the casing is provided with four apertures two of which, 74 and 76, communicate with the two pumping chambers 70 and the two pumping chambers 71, respectively, and two of which, 75 and 77, communicate with the semicircular chambers 73 and 72, respectively. Mounted on said casing is a cap 78 containing passages for leading oil from one of the apertures 74 and 76 to one of the apertures 77 and 75, respectively. As will hereinafter appear more clearly from a consideration of further embodiments, the oil may be led from the inlet aperture to an outlet aperture on the opposite side of disk 44 but on the same side of the vertical medial plane, or it may be led diagonally to an outlet aperture at the opposite side of the disk 44 and at the opposite side of the vertical medial plane, depending upon the direction in which it is desired that the oil circulate in order that it be led first to the loaded side of the bearing. As shown in Fig. 3 the oil flowing through aperture 74 when the shaft is rotating in the direction of the arrow 65 is led diagonally through the passage 79 and thence downwardly through aperture 77 into chamber 72, as shown by the arrows in Fig. 1. If the shaft were rotating in the opposite direction the oil flowing upwardly through aperture 76 would pass through a corresponding diagonal passage in the cap (not shown) to the aperture 75 and thence into the chamber 73 (Figs. 4 and 5).

Oil flowing into the chamber 72 cannot escape therefrom because of dam 69, and communicating with said chamber 72 through aperture 80 is a passage 81 which leads to the journal bearing where suitable grooving conveys the oil to the bearing surfaces, from which it flows to the sealing grooves 43 and then returns through passage 82 (see arrows in Fig. 2) to aperture 83 which communicates with chamber 73, whence the oil flows upwardly through aperture 75 (Fig. 3) through the diagonally disposed passage (not shown) above referred to, and then down through aperture 76 and pumping chamber 71 to aperture 67 which is now an outlet aperture. If the direction of the shaft is reversed, it will be clear from the foregoing that the direction of oil circulation is reversed, oil flowing in through aperture 67, being deflected upwardly from pumping chamber 71 by dam 61 to and through aperture 76 and down through aperture 75 into chamber 73, through the aperture 83 and passage 82 to the journal bearing in the reverse direction, and thence back to chamber 72 through passage 81 and aperture 80, up through aperture 77, through passage 79 and down through aperture 74 to pumping chamber 70, whence it flows out through aperture 68 which is now the outlet aperture. Thus the lubricating means are fully reversible.

It is also preferred to provide the casing with means for removing oil from the periphery of the disk 44 as well as from the lateral faces thereof, and therefore as shown in the embodiment of Figs. 1 to 8 a T-shaped oil scraper 84 is mounted in a suitable aperture 85 in said cover 78 and has an axial width equal to the width of the disk 44. A coil spring 86 normally urges the oil scraper 84 into contact with the periphery of the disk. If preferred a fixed scraper joining the dams 61 can be used if sufficient clearance is provided to allow for some motion of the shaft and disk.

The housing 42 for the journal bearing is provided with suitable cavities 87 so that a body of oil is maintained into which the disk 44 dips as it rotates, as shown in Fig. 2. Thus the disk draws oil into the axially narrow chambers formed between the rotating face of the disk 44 and the stationary sides of the casing, providing a viscosity pump.

The embodiment of Figs. 1 to 8 is adapted to develop a substantial head on the oil removed from the rotating disk and to force it through the grooves in the journal bearing under considerable pressure. For smaller installations where circulation of the oil through the journal bearing under pressure is not necessary, a simpler construction such as shown in Figs. 9 and 10 may be employed. As here illustrated shaft 90 has mounted thereon a disk 91 which may be of the same construction, for example, as in the embodiment of Figs. 1 to 8. The casing 92 may be made in one piece or it may be made in sections divisible at a plane parallel to the disk 91 and united by bolts at 93. In either event, the casing 92 is of inverted U-shaped formation as viewed from the end so that it may be mounted and withdrawn by lowering and raising the same vertically with respect to the shaft when the upper half 94 of the bearing housing 95 is removed. As in the embodiment of Figs. 1 to 8 the opposite walls 96 and 97 of said casing are provided with inwardly directed beads or ribs 98 and 99 which are closely adjacent the lateral faces of the disk 91 so as to provide pumping chambers 100 and 101 at opposite faces of said disk. Also, as in the embodiment of Figs. 1 to 8, at least one of the pumping chambers 100 and 101, and preferably both, are provided at the top of the casing with dams 102 having oil deflecting edges 103 at both sides thereof which deflect the oil upwardly through apertures 104 into passage 105 here shown as provided in a cap 106. It is to be understood that the construction as viewed in Fig. 9 is symmetrical with respect to the vertical axial plane, so that if the shaft is rotating in the opposite direction the oil is removed from the corresponding pumping chamber at the opposite side of the vertical medial plane by the opposite face of the dam 103. The cap 106 has a medial wall 107 so that oil flowing into passage 105 cannot escape to the pumping chamber at the opposite side of the dam but, as shown in Fig. 10, the oil is deflected by the wall 107 through passage 105 whence it may be led in any suitable way, as by trough-shaped plate 108, to and through the open top 110 of a suitable reservoir 111 communicating with the journal bearing. In this embodiment, the oil as it flows from the journal bearing returns directly to the well 112. In this embodiment the weight of the casing 92 may be carried by the lower half of the bearing housing 95, as by the provision of lugs 113 on the casing 92 which are supported on the bearing housing 95 and retained in place by the cover 94 as shown in Fig. 9.

The embodiment of Figs. 11 and 12 illustrates a lubricating means in many respects similar to that disclosed in Figs. 9 and 10 but designed to produce a greater head on the oil flowing through the journal bearing. In this embodiment the disk 120, which may be of the form heretofore described, is suitably mounted on the shaft 121 and associated therewith is a casing 122 which may be mounted in any suitable way. As indicated in Fig. 11 the casing 122 may be of inverted U-shaped construction for mounting and demounting as a unit by vertical movement into and out of embracing relationship with the disk 120, as in the embodiment of Figs. 9 and 10. As in the earlier embodiments described the opposite lateral walls 124 and 125 of said casing 122 are provided with circumferential beads or ribs 126 and 127 which are closely adjacent the faces of the disk 120 and therefore provide pumping chambers 128 and 129 as heretofore described. As in the earlier described embodiments a dam 130 having oil deflecting edges 131 is provided at one or both faces of the disk so that for either direction of rotation of the shaft oil carried upwardly in one or both of said pumping chambers is deflected upwardly through an aperture 132 or 132'. In this embodiment the cap 128' is provided with a vertically extended passage 133 communicating with aperture 132 whereby oil deflected upwardly therethrough is caused to rise to the height of the corresponding passage 134, whence it is delivered to reservoir 135 which communicates with a passage 136 leading to the journal bearing. The cap is provided with an intermediate wall 137 which cooperates with the dam and separates the passage 133 from a corresponding passage 138, and passage 134 from passage 134', at the opposite side of the vertical medial plane of the shaft, so that if the shaft is rotating in the opposite direction, i. e., clockwise, the oil flowing up through the corresponding pumping chamber is deflected by the opposite edge of dam 130 through aperture 132', to and through corresponding passage 138 and passage 134', whence it is delivered to the reservoir 135. Hence for either direction of rotation said reservoir 135 is copiously supplied with oil and, in view of the vertical extension of said passages, this oil may be put under a substantial head.

In order that oil may be supplied to the journal bearing during starting and before the shaft has attained sufficient speed to pump oil to and through the passage 134 or passage 134', the wall of each of said passages 133 and 138 may be provided with an aperture 139 leading to a small chamber 140 which opens into reservoir 135 through aperture 141. This enables a small but sufficient circulation of oil to be removed from the disk 120 and passed through the aperture 139 into chamber 140 and reservoir 135, so that the journal bearing is supplied with lubricant before the shaft has attained sufficient speed to pump larger quantities of oil to and through the passage 134 or passage 134' to fill the reservoir 135 and maintain the head on the oil supplied to the journal bearing. This embodiment is particularly useful for high speed bearings, providing a supply of lubricant while the shaft is gaining speed, and during high speed operation maintaining a copious supply of lubricant, under a substantial head, on the journal bearing.

If provision is made for closing off communication between the passages leading from the pumping chambers at the opposite sides of the dam 130, even higher pressures can be maintained on the oil. Thus, as shown in Fig. 13, the passage 134 may be directly connected to a passage or chamber 142 constituting a reservoir for the journal bearing oil, as by means of an interposed pipe 143, which is preferably made flexible, and communication between the chambers at the opposite sides of the dam 130 may be prevented by a valve at 144. Referring to Figs. 14 and 15, which show suitable constructions in detail, Fig. 14 shows the apertures 132 and 132' communicating through apertures 145 and 146, respectively, with chambers 147 and 148, respectively, which may conveniently be provided in a block 149 secured to the top of the casing. Superimposed on said block 149 is the cap 150 which has apertures 151 and 152, respectively, communicating with the chambers 147 and 148. Disposed in said chambers 147 and 148 are balls 153 and 154, respectively. Apertures 151 and 152 lead to a chamber 155 which communicates with a single passage 134 that leads to reservoir or chamber 142. When oil is deflected upwardly through aperture 132, ball 153 is elevated and the oil may flow freely through chamber 155 to passage 134, and thence through pipe 143 to the chamber 142 communicating with the journal bearing. The suction that is created in the chamber at the opposite side of the dam 130 and the pressure of the oil in chamber 148 in communication with chamber 155 now holds ball 154 seated so as to close the aperture 146 and prevents escape of the oil through aperture 146. Hence the oil removed from the disk and delivered to the journal bearing may be maintained under a considerable pressure. If the disk rotates in the opposite direction, ball 154 is raised from its seat and ball 153 seated, and a like result obtained.

Alternatively, the construction shown in Fig. 15 may be used. In this form the cap 160 has chambers 161 and 162 which are separated by a wall 163 that cooperates with the dam 130, or an extension thereof. A chamber 164 extends transversely and has apertures 165 and 166, respectively, communicating with the chambers 161 and 162. An intermediate aperture 167 leads to chamber 168 which communicates with passage 134. Disposed in chamber 164 is a ball 170. It will be apparent that as the oil is deflected upwardly through passage 132 or 132' the pressure of the oil will cause the ball 170 to take up its position at one end or the other of the chamber 164, closing the corresponding aperture and permitting free flow of oil from the oil collecting side of the disk to and through the chamber 168 to the passage 134. As communication between the passages through which the oil is flowing and the pumping chamber at the opposite side of the dam 130 is thus prevented, the suction in the latter chamber cannot pull oil thereinto, and therefore the oil forced to the journal bearing may be maintained under a considerable pressure.

The efficiency of the oil pumping means may be further increased by providing means closely surrounding the periphery of the pumping disk at that portion thereof which projects from the casing into the oil well. The embodiment of Figs. 11 and 12 includes a semicircular plate 170, which may be mounted in any suitable way as by attachment to the wall of the lower housing portion 173, as shown in Fig. 11, said plate being disposed closely adjacent the periphery of pumping disk 120, as shown in Figs. 11 and 12, so that the cooperation of said relatively movable parts increases the viscosity pump action. The casing 122 may itself be supported in any suitable way, the same being here shown as provided with radially extending lugs 171 which are received in recesses 172 in the lower half of the bearing housing 173 and retained in position when the upper half 174 of the bearing housing is in place.

The embodiment of Fig. 16 illustrates a semicircular projection 180 on the wall of the bearing housing 186, said projection performing the function of the semicircular plate 170 of Figs. 11 and 12, and thereby increasing the efficiency of the pumping disk. In this embodiment of Fig. 16 the pumping disk 181 is shown as made in halves suitably attached at 182, but in this embodiment the hub 183 of said pumping disk is directed inwardly, whereas in the other embodiments above described said hub is directed outwardly. Either construction may be employed as preferred in any of the various embodiments of the present invention, and if desired for reasons of strength, speed or otherwise, said pumping disk may be provided with both inwardly and outwardly extending hubs. The construction illustrated in Fig. 16 is ordinarily preferred because the inwardly directed hub permits the outer wall 184 of the casing 185 to be brought closely adjacent the periphery of the shaft at that side of the casing where it is desired to minimize outward flow of the oil along the shaft. Otherwise the embodiment of Fig. 16 may include any suitable provision for removing and directing the oil to the journal bearing as heretofore described in conjunction with Figs. 1 to 15 inclusive or to be hereinafter referred to.

Figure 18:
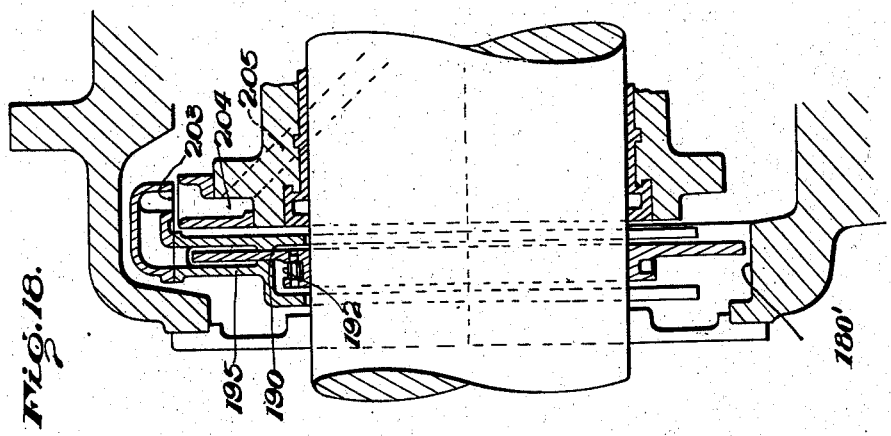
Figs. 17 and 18 are, respectively, an end view partly broken away and an axial section of another embodiment of the present invention.
Figure 17:
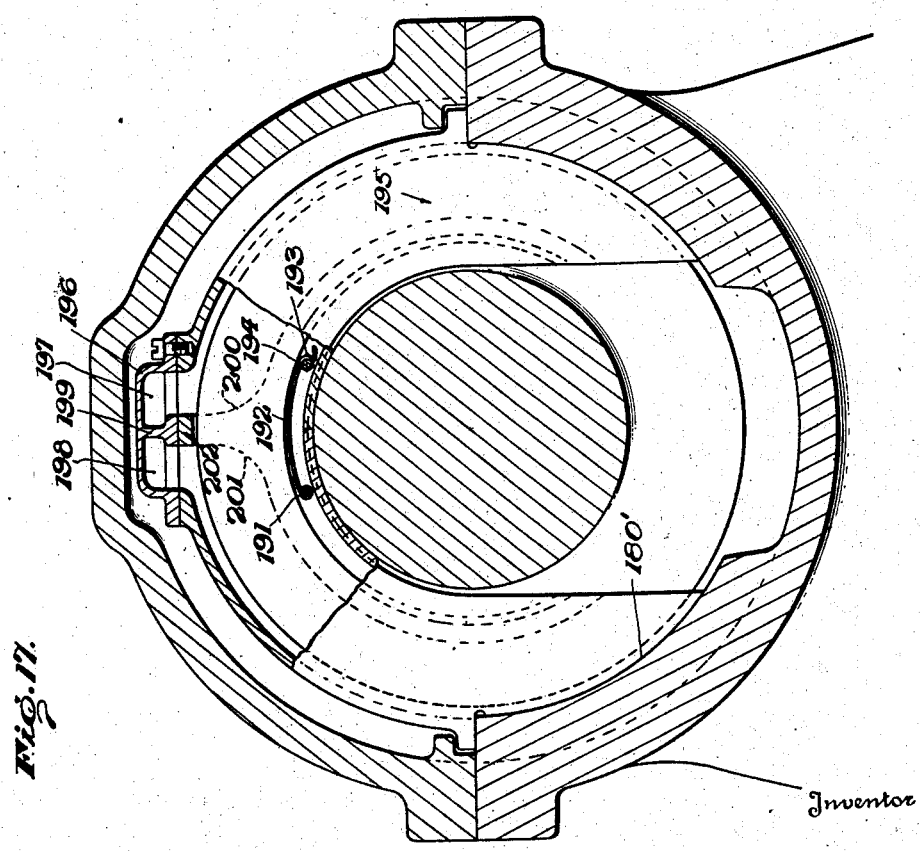

In place of bolting the rotatable disk around the shaft, as heretofore described, said disk may be made in halves locked about the shaft as shown in Figs. 17 and 18. In this embodiment the disk 190 is made in halves and one-half has mounted thereon, in any suitable way, as by pin 191, an arcuate locking strip or spring 192 which is curved at its extremity 193 and adapted to interlock with a pin 194 on the other half. The casing 195 may be of any suitable construction and as here shown the cap 196 has a pair of passages 197 and 198 separated by a wall 199 whereby oil removed from the disk and deflected upwardly by one or the other of the deflecting edges 200 or 201 of the dam 202, depending upon the direction of rotation, will be directed through one of said passages 197 and 198 into an outlet 203 from which the oil falls into a chamber or reservoir 204 that communicates with a passage 205 leading to the journal bearing. This embodiment shows the lower housing formed to provide the surface 180' for cooperation with the periphery of the disk and comparable to 170 and 180 of Figs. 11 and 16, respectively.

As heretofore pointed out the casing may be made in sections divisible or separable at or parallel to the plane of the rotating disk, whether the casing is of the inverted U-shaped type, as in Figs. 9, 11 and 17, or of a form surrounding the whole or the major portion of the rotating disk, as in Fig. 1, for example, or the two sides of the casing may be made integral, as in Fig. 17, for the U-shaped type construction either with or without provision for subdivision at a diametrical plane. Also, where the casing surrounds the whole or the major portion of the disk and is composed of sections separable at a plane parallel to the disk, each section at the face of the disk may itself be subdivided on a diametrical plane, as heretofore pointed out. The embodiment of Figs. 19 and 20 discloses a construction wherein the casing embraces the whole or major portion of the disk and wherein its lateral walls are integrally united, but wherein the casing is divisible on a diametrical plane. As here shown, the housing 210 is of U-shaped cross section with its lateral walls 211 and 212 integrally united at the peripheral wall 213, but said casing is divisible on a diametrical plane 214, here shown as vertically disposed. To retain the two halves of the casing in position, the upper portion of said halves are provided with one or more flanges 215 through which are passed one or more bolts 216 for rigidly securing the halves together. At the lower extremity of said halves the end walls may be in mere abutting relationship, or if preferred a dowel pin may be interposed between the two. When such a construction is employed, if it is desired to remove the casing halves when the upper half 217 of the housing 218 is removed, provision must be made for rotating the casing 210 on the disk so that each half may be in a position to be removed vertically therefrom. To this end the support of the casing 210 at the sides thereof is effected by means of a removable lug 219 which may be secured to the housing 218 in any suitable way, as by one or more screws 220. When the upper half 217 of the housing is removed, the lug or lugs 219 may also be removed, and one half of the casing may thereupon be rotated on the disk until it is uppermost for withdrawal, assuming the bolts 216 have also been removed. The provision for collecting and removing the oil in the embodiment of Figs. 19 and 20 is otherwise illustrated as the same as that of Figs. 17 and 18.

In describing the embodiment of Figs. 1 to 8 reference was made to the cap for the casing containing provision whereby the oil flowing from both sides of the disk at one side of the oil removing dams or the other would be passed diagonally to the opposite side of the disk and the opposite side of the dam for circulation to and through the journal bearing. Figs. 21 to 25, inclusive, show by enlarged sections a suitable construction of cap that may be employed where this type of circulation is desired. The cap 225 has a pair of inlet apertures 226 and 227, corresponding with the apertures 74 and 76 of Fig. 5. A pair of outlet apertures 228 and 229 correspond with the apertures 75 and 77 of Fig. 5. Interiorly said cap is provided intermediate its top and bottom with a wall 230 which at its outer extremity is connected to the outer wall of the cap and at its inner extremity is connected to the intermediate inner wall 231 which cooperates with the dam. Thereby, as shown in Fig. 23, a pair of transverse passages 232 and 233 are provided in said cap, each of said passages extending diagonally, so that passage 232 connects apertures 226 and 229 and passage 233 connects apertures 227 and 228. Thereby, for either direction of rotation, the oil flowing through the corresponding inlet aperture 226 or 227 is directed diagonally to the outlet passage 229 or 228, respectively, and which is disposed both at the opposite side of the disk and at the opposite side of the dam with respect to the inlet aperture. Opening 234 is provided in the structure as shown to receive a wiping member of the form shown at 84 in Fig. 1.

It is desirable that the oil withdrawn from the rotating disk be first directed to the loaded side of the journal bearing, and the construction just described is that which is suitable when to effectuate this flow the loaded side of the journal bearing is on the opposite side of the vertical medial plane of the bearing from that side wherein the rotating disk is moving upwardly. If the loaded side of the bearing is on the same side of the vertical medial plane as the upwardly rotating portion of the disk, the internal passages in the cap will not extend diagonally as illustrated in this embodiment but such as to connect apertures 226 and 228, on the one hand, and apertures 227 and 229, on the other hand, as will be apparent from embodiments yet to be described. Alternatively, the oil removing and directing means may be so constructed as to direct oil to both sides of the vertical medial plane so that it will flow simultaneously to both sides of the journal bearing, as to be hereinafter explained.

In the embodiment of Figs. 1 to 8, for either direction of shaft rotation, the beginning and end of the oil circuit is at the oil pump, and as gravity assists the flow through the outflow chambers, say 11 in Fig. 1 if the disk is rotating in the direction of the arrow 65, while gravity opposes such flow in the inflow chambers 70, the pressure in said circuit changes from superatmospheric pressure to sub-atmospheric pressure at some point in the circuit, with consequent tendency to aeration. A superatmospheric pressure throughout the circuit may be maintained in a bearing having provision for reversible oil flow by use of a valve as now to be described.

The embodiment of Figs. 26 and 27 which may be considered as an alternative for that of Figs. 21 to 25, inclusive, includes valve means for developing such higher pressure. As here shown, inlet apertures 240 and 241 communicate with the opposite ends of a chamber 242 which is restricted at its opposite ends as shown at 243 and 244. Contained in said chamber 242 is a ball 245 which may engage either of the constrictions 243 and 244 as a valve seat. A single outlet passage 246 communicates with chamber 242 through aperture 247. When oil enters through the inlet aperture 240 the ball 245 closes the constriction 243 and the oil flows outwardly through chamber 242, aperture 247 and passage 246. If the direction of the disk is reversed oil will enter through aperture 241, the ball 245 will close constriction 244 and the oil will again flow through chamber 242, aperture 247 and passage 246. Therefore, for either direction of rotation the ball 245 closes the passages through which oil is flowing from those communicating with the pumping chamber at the suction side of the disk.

For either direction of rotation the oil flows from passage 246 into chamber 248 which communicates with both the chambers 72 and 73 in the embodiment of Figs. 1 to 8. Thereby the oil in the grooves of the journal bearing is under a head through both passages 81 and 82, and instead of the oil returning through chamber 73 and pump chamber 71, it escapes from the oil seal grooves back to the reservoir or through a suitably constricted leakage opening to maintain the desired pressure in the journal bearing grooves.

As will be apparent, by suitably changing the manner in which the passages are connected, in place of a single outlet aperture for both directions of rotation, the flow may be made to occur through the chamber at the opposite side of the disk or at the opposite side of the dam or at the opposite side of the disk but at the same side of the dam, as heretofore described in connection with other embodiments, or as shown in Fig. 27A, which is a modified view of the lower portion of Fig. 27, the chamber 248 may have a partition 248' whereby the oil from passage 246 will always flow into chamber 72 of the embodiment of Figs. 1 to 8, while the outer wall of the cap is provided with a suitable aperture 249 through which the oil returning from the journal bearing through chamber 73 will escape to the exterior and return to the reservoir. Thus the oil will flow through the journal bearing in the same direction for either direction of rotation of the shaft. If preferred the oil could be made to always flow through chamber 73 and return through chamber 72. Alternatively the structure of Figs. 26 and 27 could be used with a special gasket of sheet metal that would direct the oil flowing through passage 246 into one or the other of chambers 72 and 73 as desired for the particular bearing. By making the discharge aperture 249 of suitable size a back pressure can be maintained on the oil in the grooving of the journal bearing and thus the oil throughout its circuit is kept at superatmospheric pressure so that aeration of the oil is minimized. On the other hand, if the shaft is to rotate in one direction only, the same results may be secured without a valve by permanently closing the aperture that is temporarily closed by the valve in the embodiments shown.

So far the embodiments of the present invention have been illustrated as employing rotating disks for raising the oil to the oil collecting and directing means. The present invention, however, may also be embodied in structures employing a rotating ring for raising the oil to the collecting and directing means, and embodiments employing rings are shown in Figs. 28 to 39, inclusive.

Referring first to Figs. 28 and 29, the shaft 250 is provided with a journal bearing 251 of any suitable construction and mounted at the end of the journal bearing shell, as by one or more bolts 252, is a casing 253 which may take a variety of constructions as with casings for rotating disks. As here shown the casing 253 is made in halves bolted at the top as shown at 254 and abutted at the bottom, although if preferred a dowel pin may be used at the latter location. The housing preferably has a babbitted ring 255 making the same bearing clearance with the shaft as is employed in the journal bearing 251. As this babbitted portion extends completely around the shaft it acts as an oil seal to prevent oil from flowing outwardly. Interiorly, said casing is recessed as shown at 256 and mounted in said recess is an oil carrying ring 257 of any suitable size and construction. As shown in Fig. 28 the casing preferably includes an exterior circumferential wall 258 which approximates but preferably has a somewhat larger radius of curvature than the ring 257, and which extends to or below the horizontal plane through the axis of the bearing. Said wall 258 is closely adjacent the ring 257 throughout the upper portion of the ring, but flares slightly with respect thereto to provide for the swinging of the ring.

Cooperating with the uppermost portion of the ring is a dam 259 to remove oil therefrom. As shown in Figs. 28 and 29 said dam may be formed as an inwardly directed projection from the peripheral wall 258 of the casing, and a correspondingly inwardly directed projection 260 from the outer wall of the recess 256, the inner portion of the dam being completed by a plate 261 attached to the casing in any suitable way, as by screws 262, and having the configuration best illustrated in Fig. 28. At either side of the dam is an aperture 263 and 264 so that for either direction of rotation oil removed from the ring 257 by the dam 259 will be directed upwardly through one of said apertures 263 and 264 into one or the other of the passages 265 and 266 separated by partition wall 267. The oil so collected may flow to the journal bearing through a passage 268. It is to be expressly understood that the passages 265 and 266 may communicate with a well or reservoir such as described in conjunction with other embodiments, or as will be apparent, the passages may communicate with a cap having suitable passages for leading the oil to the desired portion of the bearing as in embodiments earlier described as well as hereinafter described.

Another embodiment of the present invention is shown in Figs. 30 and 31 where the construction of the casing 270 is in many respects closely similar to that described in conjunction with the embodiments of Figs. 28 and 29. In this embodiment, however, the dam 271 separates passages 272 and 273 which lead to a chamber 274 containing an extension of said dam, the two halves of said chamber being laterally extended as indicated at 275 and 276, and separate passages 277 and 278 communicate, respectively, with said chambers 275, 276, and lead to the journal bearing, so that for either direction of rotation the oil removed from the ring by the dam 271 is caused to flow through a passage 277 or 278 on the same side of the vertical medial plane of the bearing as heretofore referred to in connection with the alternative directions of circulation for embodiments using a rotating disk. By omitting the dam in chamber 274 the oil can obviously be made to flow through both passages 277 and 278 for each direction of rotation. The casing 270 of this embodiment as shown is made in one piece and is of generally inverted U-shaped configuration so that it may be raised and lowered as a unit into and out of embracing relationship with the ring, this embodiment therefore providing no seal in bearing contact with the shaft for the lower half thereof.

The embodiment of Figs. 32 and 33 is similar in construction except that the casing 280 is made in halves, which may be suitably connected as by bolts at 281 and 282, and the dam 283 is extended in vertical direction so as to develop a greater head in the oil collected, this construction being suitable for a high speed shaft. Passages 284 and 285 at opposite sides of the dam 283 communicate with passages 286 and 287 which may unite in a common well or chamber 288 from which separate passages 289 and 290 to the journal bearing may lead, or as in the embodiment of Figs. 30 and 31, said passages may be kept entirely separate so that the oil collected for either direction of rotation will be forced into a passage to the journal bearing on the same side of the vertical medial plane of the bearing. In order that oil may get to the journal bearing while the shaft is accelerating, means are preferably provided for supplying a small amount of oil to the journal bearing passages before the speed of the shaft is sufficient to develop the head required to cause the oil to rise to the passage 286 or 287. As shown in Figs. 32 and 33 each of the passages 284 and 285 has an aperture or small nozzle 291 leading therefrom into the chamber 288, so that as soon as the dam begins to collect oil from the rotating ring some of the oil will be forced through the corresponding aperture 289 to the passage or passages leading to the journal bearing.

In the various embodiments employing ring oiling, it is to be expressly understood that any of the means for collecting and directing oil heretofore described in conjunction with the disk oiling means may be employed. Thus not only may various arrangements of passages be used, as by employing caps such as heretofore described, but high pressure may be obtained by using a valve as in the case of embodiments employing disk oiling.

It is sometimes desirable to provide means whereby the oiling ring is made to certainly rotate with the shaft at the different speeds of the shaft, so that when the shaft speeds up, for example, the oiling ring will also increase its speed to supply larger quantities of oil. The embodiment of Figs. 34 and 35 employs a construction designed to effect this function. As here illustrated the casing 295 is subdivided on an inclined plane 296, the parts being suitably secured together as by bolts or screws 297. The upper part of the casing 295 is provided in any suitable way with a dam for cooperation with the ring, as by a projection 298 from one of its lateral walls and a plate 299 suitably secured to the other of its lateral walls. Said projections 298, 299, together with the roller next to be described constitute the dam.

Mounted in the recess 300 provided in the upper portion of the casing is a roller 301 mounted on a spindle or trunnion 302 carried by a pair of clips 303 mounted on or integral with a spring arm 304 which is attached to the wall of recess 305 as by screw 306. Spring arm 304 imposes a tension biasing the roller 301 into contact with the ring 257, urging the latter into frictional contact with the shaft so as to assure that the ring 257 will speed up with increasing speed of the shaft. Spindle 302 may be made hollow with suitably located holes so that the roller 301 may be properly lubricated and rotate on said spindle with a minimum of friction. The dam of which the roller constitutes a part deflects the oil upwardly through one or the other of the passages 307 and 308 into a well or reservoir 309 from which the passage or passages 310 lead to the journal bearing. As in earlier embodiments the chamber 309 may communicate with both passages 310, or by separating the chamber 309 into two chambers, the oil may be caused to flow into only one of the passages 310, on the same or on the opposite side of the vertical medial plane of the bearing, depending upon the manner in which the passages are connected.

The embodiment of Figs. 36 to 39 illustrates a somewhat different construction in the casing for a ring oiler so as to provide oil circulation to both sides of the journal bearing for either direction of shaft rotation. The casing 315 may be suitably secured to the end of the bearing shell as by one or more bolts or screws 316, and said casing is preferably made in halves which may be bolted together at their upper portion (see 317 in Figs. 38 and 39) and abutted but maintained in proper alignment at their lower portion by a dowel pin 318 (Fig. 36). Cooperating with the ring at the upper portion thereof is a dam 319 (see Figs. 38 and 39). Assuming that the shaft is rotating in an anticlockwise direction oil deflected upwardly by said dam will rise through passage 320 and flow into chamber 321 from which leads the passage 322 to one side of the journal bearing. At the same time oil flowing through passage 320 may escape through a lateral opening 323 into passage 324 that leads to chamber 325 with which communicates passage 326 leading to the opposite side of the journal bearing. Therefore, for a single direction of shaft rotation oil deflected upwardly by the dam is caused to flow to both sides of the journal bearing. The relative sizes of passages 322 and 326 may be suitably selected with respect to the location of the load so as to properly proportion the amount of oil flowing to both sides of the journal bearing, it being understood that it is frequently desirable to at least direct the major portion of the oil to that side of the journal bearing which is loaded. If the direction of rotation is reversed oil rising from the opposite side of the dam through passage 327 will flow through passage 328 to chamber 325 with admission to passage 326. Oil will also escape through a lateral passage 329 and flow through passage 330 to chamber 321 and passage 322. Hence for the opposite direction of rotation oil is supplied to both sides of the journal bearing.

While reference has heretofore been made to the elevation of oil from a well or reservoir to a shaft by means of a disk or ring, it will be apparent that pressure oiling may be employed as an alternative if the chambers in the casing are made circumferentially complete and suitable passages communicate therewith.

While the embodiments so far described employ in several instances casings which may be subdivided at or adjacent the vertical plane, it is to be understood that if preferred the plane of subdivision may be made at or adjacent the horizontal plane or in diagonally disposed planes. When a ring oiler is used the ring is preferably made in halves connected together in any suitable way so that in each instance the oil raising element whether disk or ring, together with its casing, can be assembled around the shaft while the shaft is supported in the lower half of its journal bearing housing.

It will therefore be perceived that by the present invention improved means have been provided for copiously lubricating a journal bearing from a body of oil disposed below the bearing, said oiling means employing either a rotating disk or a rotating ring and whereby some or all of the purposes set out in the foregoing objects have been accomplished. The present invention is available for low or high speed shafts, and as will be at once apparent, the head developed on the oil can be suitably selected so as to assure the desired pressure on the oil flowing to and through the journal bearing. When the speed normally developed is relatively high, means have also been provided whereby a sufficient quantity of oil is led to the journal bearing while the shaft is getting up speed. Furthermore, by combining a valve as heretofore disclosed with the oil collecting and directing means, so as to prevent the suction at the downwardly rotating side of the disk or ring being applied to the oil collected from the upwardly rotating side of said disk or ring, aeration of the circulating oil is prevented and a substantial pressure may be developed in the oil for effecting the desired circulation. Thus, for example, the circulation may be maintained at such a speed as not only to assure the maintenance of the desired bearing films, but also to rapidly abstract the heat generated by the friction in the bearing.

Depending upon the direction of the load the oil collected from the rotating disk or ring may be made to flow to the near or remote side of the journal bearing by directing the oil collected from the disk or ring to a chamber at the same side of the vertical medial plane or at the opposite side of the vertical medial plane of the bearing. On the other hand, if preferred, the oil may be directed to both sides of the journal bearing simultaneously, and by suitably selecting the sizes of passages the proportion of the oil flowing to the respective sides of the journal bearing can be predetermined in conformity with the needs as dictated by the direction and magnitude of the load.

It will be apparent that the present invention enables the lubricating means, whether of the disk or ring type, to be readily standardized for various bearings. As may be readily seen from a comparison of the various embodiments heretofore disclosed the disk or ring and its casing may be made alike for different bearings except for differences in the cap construction to control the direction of oil circulation. Thus, by providing different caps with different arrangements of passages and different heights of dam the lubricating means may be readily adapted to various directions of load, various speeds of shaft, and various conditions of operation as heretofore pointed out.

The embodiments disclosed also provide for either direction of shaft rotation, and therefore no change of construction is required because of the direction in which the shaft will normally rotate, while the lubricating means is also available where the shaft may be at different times rotated in opposite directions. The constructions disclosed are relatively simple to make, and also to assemble because the various lubricating means may be assembled about the shaft while supported in the lower half of the journal bearing housing. As the lubricating means is disposed entirely outside of the journal bearing area, no reduction in said area is required, and therefore the mounting of lubricating means on the end of the journal bearing shell as herein disclosed possesses the additional advantage that adequate lubrication is assured without diminution of the maximum bearing area for any given shell with which it is to be assembled. Other advantages and benefits arising from the present invention will now be apparent to those skilled in the art.

While the embodiments of the invention illustrated on the drawings have been described with considerable particularity, it is to be expressly understood that the invention is not restricted thereto, as the same is capable of receiving a variety of mechanical expressions, only some of which have been illustrated on the drawings. It is to be expressly understood that features illustrated in connection with only some of the embodiments may be employed in other embodiments and various features from the several embodiments may be combined, or certain features may be omitted, depending upon the use to which the structure is to be put, the bearing with which it is to be associated, etc., and whether some or all of the advantages flowing from the present invention are to be attained. Changes may also be made in the details of construction, arrangement, proportion, means of attachment and connection, etc., without departing from the spirit of this invention. Reference is therefore to be had to the appended claims for a definition of said invention. Where in said claims the casing of the lubricating means is defined as stationary this is to be understood as meaning in the sense of rotation and not to exclude axial movement of said casing with the shaft unless otherwise stated.

What is claimed is:—

1. In a lubricating means for journal bearings, in combination with a rotatable shaft and a journal bearing therefor including a bearing shell, means for lubricating said journal bearing from a body of oil below said shaft including a stationary casing mounted at the end of said bearing shell, a rotatable member on said shaft, said casing providing an arcuate chamber having walls cooperating with said rotatable member for at least a major portion of its circumference to provide a pump therewith, dams in said chamber cooperating with opposite faces of said rotatable member to remove oil from said member for either direction of rotation, outlet means in the casing wall for the removed oil, a removable cover for said casing provided with a plurality of separate passages, one for each direction of rotation, and having their inlets communicating with said chamber adjacent said dams, for conveying the oil removed by said dams, and one or more passages leading to the journal bearing and communicating with the passages in said cover.

2. In a lubricating means for journal bearings, in combination with a rotatable shaft and a journal bearing therefor, means for lubricating said journal bearing from a body of oil below said shaft including a stationary casing associated with said journal bearing, said casing containing an arcuate chamber, a rotatable member on the shaft which dips into the body of oil below said shaft, said chamber having walls cooperating with said member to provide a pump therewith, means in said chamber for removing oil from said rotatable member, said removing means cooperating with said rotatable member to remove oil therefrom for each direction of rotation, passages leading from the opposite sides of said removing means and through which the oil is deflected for one direction of rotation or the other, and means for closing the passage through which oil is not flowing for each direction of rotation.

3. In a lubricating means for journal bearings, in combination witth a rotatable shaft and a journal bearing therefor, means for lubricating said journal bearing from a body of oil below said shaft including a stationary casing associated with said journal bearing, said casing containing an arcuate chamber, a rotatable member on the shaft which dips into the body of oil below said shaft, said chamber having walls cooperating with said member to provide a pump therewith, means in said chamber for removing oil from said rotatable member, means for imposing a head on the oil flowing to said journal bearing including a vertically extending passage through which the oil must flow from said removing means to said journal bearing, and separate means for leading oil to said journal bearing when said head producing means is ineffective.

4. In a lubricating means for journal bearings, in combination with a rotatable shaft and a journal bearing therefor, means for lubricating said journal bearing from a body of oil below said shaft including a stationary casing associated with said journal bearing, said casing containing an arcuate chamber, a rotatable member on the shaft which dips into the body of oil below said shaft, said chamber having walls cooperating with said member to provide a pump therewith, means in said chamber for removing oil from said rotatable member, said removing means cooperating with said rotatable member to remove oil therefrom for either direction of rotation, means for imposing a substantial head on the oil flowing to the journal bearing including separate upwardly extending passages leading from the opposite sides of said removing means for conveying oil for opposite directions of rotation, and means for sealing the inactive passage leading from said oil removing means to prevent suction therein from reducing the pressure developed in the oil in the active passage.

5. In a lubricating means for journal bearings, in combination with a rotatable shaft and a journal bearing therefor, means for lubricating said journal bearing from a body of oil below said shaft including a casing, a rotatable member on said shaft cooperating with an arcuate chamber in said casing to provide a viscosity pump therewith, means in said chamber cooperating with said member for removing oil therefrom, a vertically extending passage into which the deflected oil is directed and in which a substantial head is imposed on said oil when said shaft is rotating at high speed, a passage communicating with the lower end of said first named passage and through which the deflected oil is directed when the shaft is rotating at low speed, and a common passage into which both of said passages lead for conveying oil to the journal bearing.

6. In a lubricating means for journal bearings, in combination with a rotatable shaft and a journal bearing therefor, means for lubricating said journal bearing from a body of oil below said shaft including a casing, a rotatable member mounted on said shaft and cooperating with an arcuate chamber in said casing to provide a viscosity pump therewith, means in said chamber for removing oil from said member for either direction of rotation, separate passages communicating with said chamber at opposite sides of said removing means, and means cooperating with said passages and actuated by the pressure of the oil in the active passage for closing the inactive passage.

7. In a lubricating means for journal bearings, in combination with a rotatable shaft and a journal bearing therefor, means for lubricating said journal bearing from a body of oil below said shaft including a casing that is U-shaped in cross section in radial planes, a rotatable member on said shaft cooperating with an arcuate chamber in said casing to provide a viscosity pump therewith, means in said chamber for removing oil from at least one of the lateral faces of said rotatable member, a removable cap carried by said casing, and means mounted on and removable with said cap for removing oil from the periphery of said rotatable member, and a passage leading from said removing means to said journal bearing.

8. In a lubricating means for journal bearings, in combination with a rotatable shaft and a journal bearing therefor, means for lubricating said journal bearing from a body of oil below said shaft including a casing, a rotatable disk mounted on said shaft, said disk being composed of sections adapted to be united around said shaft, resilient means for normally urging said disk sections into gripping relationship with said shaft, said casing being composed of sections adapted to be mounted in cooperative relationship with said disk while said disk is mounted on said shaft, said disk cooperating with an arcuate chamber in said casing to provide a viscosity pump therewith, means in said chamber for removing oil from said disk, and a passage from said removing means to said journal bearing.

9. In a lubricating means for journal bearings, in combination with a rotatable shaft and a journal bearing therefor, means for lubricating said journal bearing from a body of oil below said shaft including a casing, a rotatable disk mounted on said shaft and cooperating with an arcuate chamber in said casing to provide a viscosity pump therewith, diametrically disposed dams in said chamber cooperating with said disk at opposite faces thereof whereby substantially semicircular chambers are provided, said chambers having inlet apertures communicating with the oil below said shaft, a pair of semicircular chambers concentrically arranged with respect to said first named chambers and having outlet passages leading to said journal bearing, and means cooperating with a dam at one side of said shaft for conveying oil from one of said first named chambers to one of said second pair of chambers.

10. In a lubricating means for journal bearings, in combination with a rotatable shaft and a journal bearing therefor, means for lubricating said journal bearing from a body of oil below said shaft including a casing, a rotatable disk mounted on said shaft and cooperating with an arcuate chamber in said casing to provide a viscosity pump therewith, diametrically disposed dams in said chamber cooperating with said disk at opposite faces thereof whereby substantially semicircular chambers are provided, said chambers having inlet apertures communicating with the oil below said shaft, a pair of semicircular chambers concentrically arranged with respect to said first named chambers and having outlet passages leading to said journal bearing, and means cooperating with a dam at one side of said shaft for conveying oil from one of said first named chambers to that one of said second pair of chambers which is diagonally disposed with respect thereto.

11. In a lubricating means for journal bearings, in combination with a rotatable shaft and a journal bearing therefor, means for lubricating said journal bearing from a body of oil below said shaft including a casing, a rotatable disk mounted on said shaft and cooperating with an arcuate chamber in said casing to provide a viscosity pump therewith, diametrically disposed dams in said chamber cooperating with said disk at opposite faces thereof whereby substantially semicircular chambers are provided, said chambers having inlet apertures communicating with the oil below said shaft, a pair of semicircular chambers concentrically arranged with respect to said first named chambers and having outlet passages leading to said journal bearing, means cooperating with a dam at one side of said shaft for conveying oil from one of said first named chambers to one of said second pair of chambers, and means cooperating with said passages and actuated by the pressure of the oil for sealing the inlet chamber which is inactive.

12. In a lubricating means for journal bearings, in combination with a rotatable shaft and a journal bearing therefor, means for lubricating said journal bearing from a body of oil below said shaft including a casing, a rotatable member on said shaft cooperating with an arcuate chamber in said casing to provide a pump therewith, one or more dams in said chamber for removing oil from different portions of said member, outlet means in the casing wall through which the removed oil is deflected, and a removable cap mounted on said casing and cooperating with said outlet means, said cap containing separate passages for leading oil removed from different portions of said rotatable member to said journal bearing.

13. In a lubricating means for journal bearings, in combination with a rotatable shaft and a journal bearing therefor, means for lubricating said journal bearing from a body of oil below said shaft including a casing, a rotatable member on said shaft cooperating with an arcuate chamber in said casing to provide a pump therewith, means in said chamber for removing oil from said member for either direction of shaft rotation, and a cap for said casing containing passages for leading oil from said removing means to said journal bearing for either direction of rotation, said passages in said cap being diagonally disposed so that oil removed by one side of said removing means is conveyed to oil passages leading to the journal bearing at the opposite side of the vertical medial plane of said bearing.

14. In a lubricating means for journal bearings, in combination with a rotatable shaft and a journal bearing therefor, means for lubricating said journal bearing from a body of oil below said shaft including a casing, a rotatable member on said shaft cooperating with an arcuate chamber in said casing to provide a pump therewith, means in said chamber for removing oil from said member for either direction of shaft rotation, a cap for said casing containing a common passage leading to said journal bearing, passages leading from the opposite sides of said removing means to said common passage, and means in said common passage actuated by the oil for closing one or the other of the passages leading from the opposite sides of the oil removing means.

15. In a lubricating means for journal bearings, in combination with a rotatable shaft and a journal bearing therefor, means for lubricating said journal bearing from a body of oil below said shaft including a casing, a rotatable member on said shaft cooperating with an arcuate chamber in said casing to provide a pump therewith, means in said chamber for removing oil from said member for either direction of shaft rotation, and a cap for said casing containing passages for leading oil from said removing means to said journal bearing for either direction of rotation, said passages leading from opposite sides of said oil removing means to passages at the same side of the vertical medial plane of said bearing, said last named passages leading to the journal bearing.

16. In a lubricating means for journal bearings, in combination with a rotatable shaft and a journal bearing therefor, means for lubricating said journal bearing from a body of oil below said shaft including a stationary casing associated with said journal bearing, said casing containing an arcuate chamber, a rotatable member on the shaft which dips into the body of oil below said shaft, said chamber having walls cooperating with said member to provide a pump therewith, means in said chamber for removing oil from said rotatable member, said removing means cooperating with said rotatable member to remove oil therefrom for either direction of rotation, passages leading from said removing means to one or both sides of said journal bearing whereby said journal bearing is supplied with oil for either direction of rotation and valve means to maintain a superatmospheric pressure on said oil flowing to said journal bearing.

HARRY A. S. HOWARTH.